US010570308B2

(12) United States Patent
Van Westerhuizen-Markus et al.

(10) Patent No.: US 10,570,308 B2
(45) Date of Patent: Feb. 25, 2020

(54) HEAT INSULATING COATING COMPOSITION, METHOD FOR APPLYING SUCH COATING COMPOSITION AND KIT OF PARTS COMPRISING SUCH COATING COMPOSITION

(71) Applicant: Akzo Nobel Coatings International B.V., Arnhem (NL)

(72) Inventors: Cynthia Margaret Van Westerhuizen-Markus, Sassenheim (NL); Arjan Christian Verbunt, Deil (NL); Evelien Rijnberg, Heemstede (NL); Joël Krikke, Dordrecht (NL)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 16/311,238

(22) PCT Filed: Jun. 30, 2017

(86) PCT No.: PCT/EP2017/066247
§ 371 (c)(1),
(2) Date: Dec. 19, 2018

(87) PCT Pub. No.: WO2018/007248
PCT Pub. Date: Jan. 11, 2018

(65) Prior Publication Data
US 2019/0185698 A1 Jun. 20, 2019

(30) Foreign Application Priority Data
Jul. 8, 2016 (EP) .................... 16178666

(51) Int. Cl.
C09D 133/08 (2006.01)
C09D 7/43 (2018.01)
E04B 1/76 (2006.01)
C09D 7/40 (2018.01)
C09D 5/14 (2006.01)
E04B 1/74 (2006.01)

(52) U.S. Cl.
CPC ............ C09D 133/08 (2013.01); C09D 5/14 (2013.01); C09D 7/43 (2018.01); C09D 7/70 (2018.01); E04B 1/76 (2013.01); E04B 2001/742 (2013.01); E04B 2001/7683 (2013.01)

(58) Field of Classification Search
USPC .......................... 156/71, 307.1, 307.3, 307.5
See application file for complete search history.

(56) References Cited

U.S. PATENT DOCUMENTS 4,623,390 A   11/1986  Delmonico
4,904,709 A   2/1990   Hermele
6,749,897 B2* 6/2004  Naji ................. B28B 1/522
                                              427/350
6,893,751 B2* 5/2005  Naji ................. B28B 1/522
                                              106/624
6,958,365 B2* 10/2005 Dontula ............. B29C 44/348
                                              521/79
7,396,402 B2* 7/2008  Naji ................. B28B 1/522
                                              106/705
7,658,967 B2* 2/2010  DiMario ............ B62D 29/043
                                              427/162
7,704,316 B2* 4/2010  Naji ................. B28B 1/522
                                              106/705
9,243,183 B2* 1/2016  Liang ................ C09K 8/887
9,540,803 B2* 1/2017  Casimiro ............ C04B 26/04
9,815,083 B2* 11/2017 Beaudry ............ B65D 88/121
2002/0170467 A1* 11/2002 Naji ................. B28B 1/522
                                              106/705
2002/0175126 A1* 11/2002 Naji ................. B28B 1/522
                                              210/723
2002/0179219 A1* 12/2002 Naji ................. B28B 1/522
                                              156/45

(Continued)

FOREIGN PATENT DOCUMENTS

| CN | 100999638 A | 7/2007 |
| CN | 101634170 A | 1/2010 |
| CN | 101760108 A | 6/2010 |
| CN | 101880139 A | 11/2010 |
| CN | 103555042 A | 2/2014 |
| CN | 103694764 A | 4/2014 |
| CN | 103937315 A | 7/2014 |
| CN | 103937316 A | 7/2014 |
| CN | 104098319 A | 10/2014 |
| CN | 104151907 A | 11/2014 |
| CN | 104530859 A | 4/2015 |
| CN | 105271931 A | 1/2016 |
| EP | 2 289 862 A1 | 3/2011 |
| EP | 2 871 169 A1 | 5/2015 |
| JP | 59-156985 A | 9/1984 |
| JP | 59-164681 A | 9/1984 |
| JP | 60-04567 A | 1/1985 |
| JP | 60-90859 A | 5/1985 |
| WO | 2002/25034 A1 | 3/2002 |
| WO | 2003/040243 A1 | 5/2003 |

(Continued)

Primary Examiner — Sing P Chan
(74) Attorney, Agent, or Firm — McDonnell Boehnen Hulbert & Berghoff LLP

(57) ABSTRACT

The invention relates to a water-based coating composition for heat insulating building surfaces, the coating composition comprising in the range of from 55 to 90 vol %, preferably of from 60 to 80 vol % hollow microspheres, in the range of from 1 to 30 wt % of a dispersed acrylic binder polymer, in the range of from 0.1 to 3 wt % of a thickener, in the range of from 40 to 80 wt % water; and in the range of from 0.05 to 5 wt % of additives selected from the group consisting of biocides, anti-foaming agents, surfactants, dispersants, and combinations of two or more thereof, wherein the coating composition is substantially free of non-hollow mineral and metallic fillers and is substantially free of hydraulic binders, and wherein the coating composition has a density of less than 500 kg/m3. The invention further relates to a method for applying such coating composition by using a notched trowel for applying a ridged coating layer and a non-woven sheet of glass fiber to (Continued)

smoothen such layer; and to a kit of parts comprising such coating composition, a non-woven sheet of glass fiber, and a notched trowel.

31 Claims, No Drawings

(56) References Cited

U.S. PATENT DOCUMENTS

| | | | | |
|---|---|---|---|---|
| 2002/0189499 A1* | 12/2002 | Naji | ........................ | B28B 1/522 106/638 |
| 2002/0192510 A1* | 12/2002 | Naji | ........................ | B28B 1/522 428/703 |
| 2003/0000424 A1* | 1/2003 | Naji | ........................ | B28B 1/522 106/705 |
| 2003/0165624 A1* | 9/2003 | Naji | ........................ | B28B 1/522 427/376.2 |
| 2004/0077738 A1* | 4/2004 | Field | ..................... | B01J 13/0091 521/50 |
| 2004/0229968 A1* | 11/2004 | Dontula | ................ | B29C 44/348 521/79 |
| 2005/0025952 A1* | 2/2005 | Field | ....................... | B32B 27/04 428/304.4 |
| 2005/0176836 A1* | 8/2005 | Dontula | ................ | B29C 44/348 521/79 |
| 2005/0208287 A1* | 9/2005 | Naji | ........................ | B28B 1/522 428/294.7 |
| 2006/0178461 A1 | 8/2006 | Bohler et al. | | |
| 2007/0048445 A1* | 3/2007 | DiMario | .............. | B62D 29/043 427/180 |
| 2007/0048504 A1* | 3/2007 | DiMario | ................ | C08G 18/12 428/195.1 |
| 2007/0062936 A1* | 3/2007 | Young | ................ | B65D 81/3446 219/730 |
| 2007/0077436 A1* | 4/2007 | Naji | ........................ | B28B 1/522 428/411.1 |
| 2008/0281028 A1* | 11/2008 | Brox | ....................... | C04B 26/04 524/426 |
| 2010/0124860 A1* | 5/2010 | Naji | ........................ | B28B 1/522 442/1 |
| 2010/0273382 A1* | 10/2010 | Nandi | ...................... | C09D 5/18 442/76 |
| 2010/0310823 A1* | 12/2010 | Albertelli | ............. | B29C 70/086 428/139 |
| 2013/0105473 A1* | 5/2013 | Beaudry | ............. | B65D 88/121 220/1.5 |
| 2014/0144630 A1* | 5/2014 | Liang | ..................... | C09K 8/887 166/280.2 |
| 2014/0324234 A1* | 10/2014 | Hromadka | ........... | B65D 88/121 700/283 |
| 2014/0335314 A1* | 11/2014 | Aldino | ................. | F16L 59/065 428/159 |
| 2015/0176267 A1* | 6/2015 | Casimiro | ................ | C04B 26/04 428/313.5 |
| 2016/0167085 A1* | 6/2016 | Beaudry | ............. | B65D 88/121 427/372.2 |
| 2018/0318874 A1* | 11/2018 | Beaudry | ............. | B65D 88/121 |
| 2019/0031893 A1* | 1/2019 | Schindly | .................. | C09D 7/00 |

FOREIGN PATENT DOCUMENTS

| | | |
|---|---|---|
| WO | 2007/131618 A1 | 11/2007 |
| WO | 2009/151988 A1 | 12/2009 |
| WO | 2011/154902 A1 | 12/2011 |
| WO | 2014/102753 A1 | 7/2014 |
| WO | 2015/155280 A1 | 10/2015 |

* cited by examiner

HEAT INSULATING COATING COMPOSITION, METHOD FOR APPLYING SUCH COATING COMPOSITION AND KIT OF PARTS COMPRISING SUCH COATING COMPOSITION

This application is the US national phase under 35 U.S.C. § 371 of international application PCT/EP2017/066247, filed Jun. 30, 2017, which claims priority to European application 16178666.0, filed Jul. 8, 2016.

FIELD OF THE INVENTION

The present invention relates to a water-based coating composition for heat insulating building surfaces, to a method for applying such coating composition to a building surface, and to a kit of parts for coating a building surface with a heat insulating layer comprising such coating composition, a non-woven sheet of glass-fiber, and a notched trowel.

BACKGROUND OF THE INVENTION

Heat insulation of buildings becomes more and more important. One method of heat insulating buildings, in particular existing buildings, is to improve the heat insulation of large building surfaces such as walls and ceilings. It is well-known to coat interior surfaces of buildings with a composition with heat insulation properties to improve the heat insulation capacity of such building surfaces.

Such coating compositions typically comprise hollow microspheres, usually hollow glass microspheres. In US2015/0176267 is for example disclosed a coating composition with a low thermal conductivity that comprises 4 to 17 wt % of hollow microspheres, 5 to 25 wt % of a water-dispersible or water-soluble binder polymer, 25 to 50 wt % of a mineral or metallic filler, 0.05 to 1 wt % of a linear fatty alcohol and 0.1 to 1 wt % of a thickener, and water. The coating composition is used as smoothening and/or heat-insulating coating for walls and ceilings.

The coating composition of US2015/0176267 comprises a significant amount of non-hollow mineral filler. Fatty alcohol is needed to avoid cracking of the coating.

There is a need in the art for coating compositions for building surfaces with improved heat insulation properties, which are easy to handle and can be applied as a single layer of sufficient and even thickness that does not crack and provides the desired degree of thermal insulation.

SUMMARY OF THE INVENTION

It has now been found that the heat insulation properties of a water-based coating composition can be improved by using at least 55 vol % of hollow microspheres, preferably at least 60 vol %, in a composition that is substantially free of non-hollow mineral fillers and metallic fillers and is substantially free of hydraulic binders such as cement or other cementitious material.

Accordingly, the invention provides, in a first aspect, a water-based coating composition for heat insulating building surfaces, the coating composition comprising a water-based coating composition for heat insulating building surfaces, the coating composition comprising:
in the range of from 55 to 90 vol %, preferably of from 60 to 80 vol % hollow microspheres;
in the range of from 1 to 30 wt % of a dispersed acrylic binder polymer;
in the range of from 0.1 to 3 wt % of a thickener;
in the range of from 40 to 80 wt % water; and
in the range of from 0.05 to 5 wt % of additives selected from the group consisting of biocides, anti-foaming agents, surfactants, dispersants, and combinations of two or more thereof,
wherein the coating composition is substantially free of non-hollow mineral and metallic fillers and is substantially free of hydraulic binders, and wherein the coating composition has a density of less than 500 kg/m$^3$.

The water-based coating composition according to the invention combines a very low thermal conductivity with a low density. Coating compositions with such low density cannot be applied with a roller. The coating composition can be applied by trowel. If a normal trowel, i.e. a smooth trowel with a straight edge, would be used, it is difficult to control the thickness of the layer applied and the thermal insulation needed might not be achieved due to lack of sufficient thickness at least at some places. It has now been found that the coating composition according to the invention can be applied, even by the inexperienced practitioner, as a single layer of substantial and controlled thickness if a notched trowel is used for applying a layer of coating composition and the applied layer is then smoothened by first adhering a non-woven sheet of glass fiber to the wet applied layer and then smoothening the wet layer by applying pressure to the sheet of glass fiber using a smoothening tool.

Accordingly, the invention provides, in a second aspect, a method for applying a coating composition as defined hereinbefore to a building surface, comprising a method for applying a coating composition according to any one of the preceding claims to a building surface, comprising:
a) applying the coating composition to the surface with a notched trowel to obtain a ridged wet layer of coating composition;
b) adhering a non-woven sheet of glass fiber to the ridged wet layer of coating composition;
c) smoothening the ridged wet layer of coating composition by applying pressure to the sheet of glass fiber using a smoothening tool to obtain a smoothened wet layer of coating composition;
d) allowing the smoothened wet layer of coating composition to dry to obtain a smooth dried coating layer; and
e) optionally applying a decorative layer onto the smooth dried coating layer.

In a third aspect, the invention provides a kit of parts for coating a building surface with a heat insulating layer comprising:
i) a water-based coating composition as hereinbefore defined;
ii) a non-woven sheet of glass fiber; and
iii) a notched trowel.
The kit of parts can advantageously be used for carrying out the method according to the invention.

DETAILED DESCRIPTION OF THE INVENTION

The coating composition according to the invention is a non-cementitious water-based coating composition for heat insulating building surfaces, in particular interior surfaces, such as walls and ceilings, prior to decorating such surfaces with for example paint or wall paper.

The coating composition comprises in the range of from 55 to 90 vol %, preferably of from 60 to 80 vol % hollow microspheres; in the range of from 1 to 30 wt % of a dispersed acrylic binder polymer; in the range of from 0.1 to 3 wt % of a thickener; in the range of from 40 to 80 wt % water; and in the range of from 0.05 to 5 wt % of additives. The coating composition is substantially free of non-hollow mineral fillers, of metallic fillers and of hydraulic binders. Reference herein to hydraulic binders is to inorganic material which sets and hardens as a result of chemical reactions with water. Examples of hydraulic binders include cement, hydraulic lime, and fly ash. Examples of non-hollow mineral fillers include calcium carbonate, magnesium carbonate, alumina, silica, silicates, and mica. Reference herein to substantially free of a compound means that the composition comprises less than 1 wt % of such compound, preferably less than 0.5 wt %, even more preferably less than 0.1 wt %, even more preferably is free of such compound.

The coating composition comprises in the range of from 55 to 90 vol %, preferably of from 60 to 80 vol % hollow microspheres; in the range of from 12 to 30 wt % of a dispersed acrylic binder polymer; in the range of from 0.1 to 3 wt % of a thickener; in the range of from 40 to 80 wt % water; and in the range of from 0.05 to 5 wt % of additives. The coating composition is substantially free of non-hollow mineral fillers, of metallic fillers and of hydraulic binders. Reference herein to hydraulic binders is to inorganic material which sets and hardens as a result of chemical reactions with water. Examples of hydraulic binders include cement, hydraulic lime, and fly ash. Examples of non-hollow mineral fillers include calcium carbonate, magnesium carbonate, alumina, silica, silicates, and mica. Reference herein to substantially free of a compound means that the composition comprises less than 1 wt % of such compound, preferably less than 0.5 wt %, even more preferably less than 0.1 wt %, even more preferably is free of such compound.

Reference herein to vol % of a compound in the coating composition is to the volume of that compound as a percentage of the total volume of the coating composition.

The coating composition has a density of at most 500 kg/m$^3$, preferably at most 450 kg/m$^3$, more preferably at most 400 kg/m$^3$.

The coating composition will typically be in the form of a paste that can still be applied as a coating layer. Therefore, the water content of the coating composition is at least 40 wt %, preferably at least 45 wt %, more preferably at least 50 wt %, even more preferably at least 55 wt %. At lower water contents, it is difficult to apply the coating composition as a layer, in particular as a layer that is smooth and evenly distributed and has a homogeneous thickness.

The hollow microspheres may be hollow microspheres of glass, other ceramic material or polymeric material. Preferably the hollow microspheres are hollow glass microspheres, hollow polymeric microspheres or a combination of hollow glass microspheres and hollow polymeric microspheres. In a preferred embodiment, the hollow microspheres are hollow glass microspheres in a coating composition that is free of other hollow microspheres.

The hollow microspheres preferably have an averaged particle size (D50) in the range of from 1 to 300 µm, more preferably of from 10 to 100 µm.

The hollow glass microspheres preferably have a density less than 500 kg/m$^3$, more preferably less than 300 kg/m$^3$, even more preferably less than 200 kg/m$^3$. Typically, the density of the hollow glass microspheres is at least 100 kg/m$^3$. Suitable hollow glass microspheres are commercially available, for example 3M™ Glass Bubbles ex. 3M.

If the coating composition comprises no hollow microspheres other than hollow glass microspheres, the composition preferably comprises in the range of from 18 to 30 wt %, more preferably of from 19 to 25 wt % of the hollow glass microspheres.

An example of suitable hollow polymeric microspheres is Expancel (ex. AkzoNobel), which are microspheres of a thermoplastic polymer with a density in the range of from 25 to 70 kg/m$^3$. If the coating composition comprises no hollow microspheres other than hollow polymeric microspheres, the coating composition preferably comprises in the range of from 1 to 5 wt %, more preferably of from 2 to 4 wt % hollow polymeric microspheres. Reference herein to the wt % of hollow polymeric microspheres is to the dry weight of the hollow polymeric microspheres, i.e. without any water that may be provided with the microspheres.

The coating composition according to the invention comprises in the range of from 1 to 30 wt % of a dispersed acrylic binder polymer, in one embodiment from 2 to 30 wt % of a dispersed acrylic binder polymer, in another embodiment from 12 to 30 wt % of a dispersed acrylic binder polymer, preferably in the range of from 18 to 25 wt %. In another embodiment the lower amount of dispersed acrylic binder polymer is from 3 wt %, 4 wt %, 5 wt %, 6 wt %, 7 wt %, 8 wt %, 9 wt % or even from 10 wt %. Reference herein to the wt % of dispersed acrylic binder polymer is to the solid (dry) weight of acrylic polymer based on the total weight of the coating composition. The acrylic binder polymer is dispersed in the aqueous phase of the water-based coating composition and will, during manufacture of the coating composition typically be added as a dispersion of polymer particles in water, usually a dispersion comprising in the range of from 30 to 70 wt % of the acrylic polymer.

Reference herein to an acrylic binder polymer is to a film-forming acrylic polymer, i.e. a polymer obtained from mono-ethylenically unsaturated monomers, typically by emulsion polymerization. There are three groups of acrylic polymers known colloquially as "acrylics", "vinyls" or "styrenics". The "acrylics" are copolymers of at least two mono-ethylenically unsaturated carboxylic acids and/or its alkyl esters, e.g. a methyl methacrylate/butyl acrylate copolymer. The "vinyls" comprise copolymers of a mono-vinyl ester of a saturated carboxylic acid, such as vinyl acetate, and at least one of either an acrylic monomer or a different mono-vinyl ester, often the vinyl ester of a carboxylic acid containing 10 to 12 carbon atoms. The "styrenics" are copolymers containing styrene, or a similar mono-vinyl aromatic monomer, together with a co-polymerizable monomer which is usually an "acrylic".

The acrylic polymer may be any water-dispersible acrylic polymer known to be suitable as a binder in coating compositions. Examples of such polymers are copolymers of styrene and (meth)acrylic acid and/or an ester of (meth) acrylic acid ('styrenics" or styrene acrylates), "vinyls" (or polyvinylacetates) such as for example co-polymers of vinyl acetate, a vinyl ester of a carboxylic acid containing 10 to 12 carbon atoms (e.g. a vinyl ester of neodecanoic acid) and a (meth)acrylic acid or an ester of (meth)acrylic acid or pure "acrylics".

The composition further comprises in the range of from 0.1 to 3 wt % of a thickener, more preferably of from 0.2 to 2 wt %. The thickener may be any thickener known to be suitable for coating compositions used as filler or smoothening layer. Such thickeners include rheology modifying clays, polysaccharide thickeners such as starch, modified starch, cellulosic thickeners such as cellulose or cellulose ethers, and associative thickeners or mixtures thereof. Preferably, the thickener is a non-clay thickener, more preferably a cellulosic thickener. Examples of suitable cellulosic thickeners include water-swellable cellulose fibers and water-soluble cellulose ethers such as hydroxyethyl cellulose, methyl cellulose, hydroxypropyl methyl cellulose, hydroxyethyl ethyl cellulose, and hydroxyethyl methyl cellulose, and mixtures of water-swellable cellulose fibers and water-soluble cellulose ethers. Cellulosic thickeners are well-known in the art and commercially available.

The coating composition is a water-based coating composition. Water is the liquid medium wherein the binder polymer and the hollow microspheres are dispersed. The coating composition comprises in the range of from 40 to 80 wt % water, preferably of from 45 to 75 wt %, more preferably of from 50 to 73 wt %, still more preferably of from 55 to 70 wt %. Part of the water may be provided by a dispersion of acrylic binder polymer or with other ingredients. Typically at least part of the water will be provided as separate ingredient.

The coating composition comprises in the range of from 0.05 to 5 wt % of additives selected from the group consisting of biocides, anti-foaming agents, surfactants, dispersants, and combinations of two or more thereof. The coating composition may comprise further additives, such as for example plasticizers, coalescence agents or or-entraining agents.

The coating composition is substantially free of non-hollow mineral fillers, metallic fillers, and hydraulic binders. Preferably, the coating composition is substantially free of any inorganic material other than the hollow microspheres. More preferably, the coating composition is substantially free of any compounds other than the hollow microspheres, the dispersed acrylic binder polymer, the thickener, water, and any additives. Such composition is for example substantially free of any further polymer binders, polymeric particles other than hollow polymeric microspheres, any inorganic material other than the hollow microspheres, and gypsum. Reference herein to additives is to additives commonly used in coating compositions for filling or smoothening and includes biocides, anti-foaming agents, surfactants, dispersants, plasticizers, coalescence agents and air-entraining agents.

As a result of the coating composition being substantially free of any inorganic material other than the low-density hollow microspheres, it has a low density, i.e. below 500 $kg/m^3$, preferably below 450 $kg/m^3$, even more preferably below 400 $kg/m^3$.

It has now been found that the coating composition according to the invention can be easily applied, even by an inexperienced practitioner, to a building surface by a method comprising the following steps:
a) applying the coating composition to the surface with a notched trowel to obtain a ridged wet layer of coating composition;
b) adhering a non-woven sheet of glass fiber to the ridged wet layer of coating composition;
c) smoothening the ridged wet layer of coating composition by applying pressure to the sheet of glass fiber using a smoothening tool to obtain a smoothened wet layer of coating composition;
d) allowing the smoothened wet layer of coating composition to dry to obtain a smooth dried coating layer; and
e) optionally applying a decorative layer onto the smooth dried coating layer.

In step a), the coating composition is applied on the surface using a notched trowel. Preferably, a suitable amount of coating composition is first scooped to the notched trowel and then spread out using the notched trowel to obtain a corrugated or ridged wet layer of coating composition. In step b), a non-woven sheet of glass fiber is adhered to the wet layer of coating composition. The sheet may be applied manually, by slightly pressing the sheet upon the wet layer. Optionally a smoothening tool, such as a smooth trowel, i.e. a trowel with straight edges (no notches) also known as a Venetian trowel, can be used to press the sheet upon the wet coating layer. In step c), the ridged wet layer of coating composition is smoothened by applying pressure to the sheet of glass fiber using a smoothening tool to obtain a smoothened wet layer of coating composition. It will be appreciated that steps b) and c) may be combined in a single step. The amount of coating composition applied to the surface in step a) is preferably sufficient to obtain a smoothened layer of at least 2 mm, more preferably at least 3 mm, even more preferably at least 5 mm. If a single layer is applied is step a), the smoothened wet layer obtained in step c) preferably has a thickness in the range of from 2 to 10 mm, more preferably of from 3 to 8 mm.

Important advantages of the method according to the invention, in particular the combined use of notched trowel and non-woven sheet of glass fiber, are that the thickness of the coating layer applied can be controlled and that the coating composition can be applied in layer of sufficient thickness that is smooth and has an even thickness over the entire layer area, even if applied by an inexperienced, i.e. non-professional, practitioner. Reference herein to a notched trowel is to a trowel having at least one edge with so-called notches or teeth.

If, in order to provide the desired heat insulation, an even thicker coating layer would be needed than could be applied with a single layer, step a) may be repeated before a non-woven sheet of glass fiber is adhered to the upper ridged wet layer of coating composition in step b). Preferably, the second and optional further layers are applied such that the ridges have a direction perpendicular to or at least at an angle of 30° compared to the direction of the ridges in the previous ridged layer. The second layer and any further layers are preferably applied to the previous ridged layer after the previous layer has sufficiently dried to resist substantial de-forming by the application is a further layer.

It has been found that the size and shape of the notches on the notched trowel have an effect on the ease of application of the coating layer, on the maximum layer thickness that can be achieved whilst obtaining a homogeneous layer with a homogeneous thickness, without having any defects.

The notched trowel may be a square notch, V-notch, or U-notch trowel. Preferably, the notched trowel is a U-notch trowel, i.e. a notched trowel with a half-circular shape between two adjacent notches. The use of such U-notch trowel results in improved and easier application of a coating layer of a certain thickness (as obtained after smoothening) compared to use of a square notch or V-notch trowel.

In a preferred embodiment, the notched trowel is a U-notch trowel wherein the radius of the half-circular shape between two adjacent notches is in the range of from 2 to 8 mm, more preferably of from 3 to 6 mm. Preferably, the depth of the notches is larger than the radius of the half-circular shape between two adjacent notches. More preferably the depth of the notches is at least 1.5 times the radius of the half-circular shape between two adjacent notches, more preferably the depth of the notches is in the range of from 2 to 5 times the radius of the half-circular shape between two adjacent notches. Reference herein to the depth of a notch is to the difference in height between the top of a notch and the deepest point of the valley between the notch and its adjacent notch.

Preferably, the depth of the notches is in the range of from 5 to 25 mm, more preferably of from 6 to 20 mm, even more preferably of from 7 to 15 mm, most preferably of from 8 to 13 mm. The distance between adjacent notches is preferably in the range of from 4 to 16 mm, preferably of from 6 to 12 mm. Reference herein to the distance between notches is to the width of the space between two adjacent notches For a U-notch trowel the distance between adjacent notches is twice the radius of the half-circular shape between two adjacent notches.

The width of a notch (teeth width) is preferably in the range of from 2 to 10 mm, more preferably of from 3 to 8 mm, even more preferably of from 3 to 6 mm.

Preferable, the width of a notch is smaller than the distance between two adjacent notches, more preferably the width of a notch is at most half the 0.7 times the distance between two adjacent notches, even more preferably at most 0.6 times.

In a preferred embodiment, the notched trowel is a U-notch trowel with a notch width of 3 to 6 mm, a radius of the half-circular shape between two adjacent notches in the range of from 3 to 6 mm (implying a distance between two adjacent notched in the range of from 6 to 12 mm), a notch depth in the range of from 8 to 13 mm, wherein the notch width is at most 0.7 times the distance between two adjacent notches. In a particular preferred embodiment, the notched trowel is a U-notch trowel with a notch width of 4 mm, a radius of the half-circular shape between two adjacent notches of from 4 mm (implying a distance between two adjacent notches of 8 mm), and a notch depth of 11 mm The non-woven sheet of glass fiber may have any suitable density to allow air to escape from the wet layer through the sheet of glass fiber, whilst smoothening the wet layer. Preferably, the non-woven sheet has an area density in the range of from 30 to 250 g/m$^2$, preferably of from 40 to 150 g/m$^2$, more preferably of from 50 to 100 g/m$^2$.

In step d), the smoothened wet layer of coating composition is allowed to dry to obtain a hardened, dried coating layer. A decorative layer may be applied to the dried coating layer in optional step e). Such decorative layer may for example be a paint layer or decorative wall paper.

The coating composition may be applied to any suitable surface, including but not limited to concrete surfaces, brick walls, plaster, plaster boards, wooden surfaces. The surface may be a surface that is still covered with existing coating layers, such as for example existing paint layers. Since the coating composition not only provides heat insulation, but also smoothening of surfaces, it may suitably be applied to surfaces with defects such as cracks, small holes and other surface irregularities.

The invention further relates to a kit of parts that can be used in the method according to the invention for coating a building surface with a heat-insulating layer. The kit of parts comprises a water-based coating composition according to the first aspect of the invention, a non-woven sheet of glass fiber, and a notched trowel. The non-woven sheet of glass fiber and the notched trowel are as described hereinabove. Preferably, the kit of parts further comprises a smoothening tool, for example a smoothening trowel, for smoothening the ridged wet layer of coating composition in step c) of the method according to the invention.

EXAMPLES

The invention will be further illustrated by means of the following non-limiting examples.

Example 1

A water-based coating composition was prepared by adding an emulsion of acrylic polymer and hollow glass microspheres to a vessel and mixing the two ingredients using a stirrer until a homogeneous paste was obtained. Water, surfactant, thickeners, and further additives (biocide and defoaming agent) were then added under continuous stirring. The composition of the coating composition thus prepared is given in Table 1. The composition contained 63 vol % hollow glass microspheres, based on the total volume of the composition. The coating composition obtained had a density of 380 kg/m$^3$.

TABLE 1

| Coating composition with hollow glass microspheres | |
|---|---|
| Ingredient | wt % |
| water | 39 |
| surfactants | 0.05 |
| biocide | 0.4 |
| cellulosic thickener (cellulose fibers) | 1.0 |
| hydroxyethyl methyl cellulose | 0.5 |
| vinyl acetate/vinyl neodecanoate/acrylate copolymer dispersion (50% solids) | 39 |
| 3M Scotchlite Glass Bubbles K15 | 20 |
| defoaming agent | 0.05 |

The coating composition was applied on vertically extending plaster board using a roller, a smooth trowel (no notches), and different notched trowels. It was not possible to apply the composition with a roller. It was possible to apply the coating composition with a smooth trowel, but it appeared to be difficult to obtain a smooth layer and to control the layer thickness (to obtain a pre-set thickness). In Table 2, the results of applying the coating composition with different notched trowels is given. The ease of application of a ridged wet layer that is evenly and homogeneously distributed and results in a predictable layer thickness is determined according to the following scale:

++ very easy to apply an evenly and homogeneously distributed wet layer

+ easy to apply an such layer

+/− careful application needed to obtain such layer

− difficult to apply such layer (part of wet coating layer tends to be drawn from the wall with the trowel)

TABLE 2

| Application of coating composition with different trowels | | | | |
|---|---|---|---|---|
| trowel | Notch type | Notch size[a] (width × distance × depth) | Ease of application | Thickness single layer[b] |
| 1 | square | 4 × 4 × 6 | ++ | 1.5 mm |
| 2 | square | 10 × 10 × 10 | − | 2.5 mm |
| 3 | U-notch | 10 × 10 × 10 | + | 2.5 mm |
| 4 | 45° square notch[c] | 6 × 6 × 6 | − | <2 mm |
| 5 | square | 8 × 8 × 15 | − | 2.5 mm |
| 6 | U-notch with V-shaped notch[d] | 5 × 6 × 8 | ++ | 1.2 mm |
| 7 | square | 4 × 4 × 11 | − | <2 mm |
| 8 | U-notch | 4 × 8 × 11 | + | 3.8 mm |
| 9 | U-notch | 4 × 8 × 15 | +/− | 5 mm |

[a]width × distance between adjacent notches × depth (all in mm)
[b]after application of glass fiber non-woven and smoothening
[c]notch under an angle of 45° relative to trowel blade
[d]width of notch is decreasing towards the top of the notch (from 8 mm to 5 mm)

Example 2

A water-based coating composition comprising hollow polymeric microspheres was prepared by adding an emulsion of acrylic polymer and Expancel to a vessel and mixing the two ingredients using a stirrer until a homogeneous paste was obtained. Water, surfactant, thickeners, and further additives (biocide and defoaming agent) were then added under continuous stirring. The composition of the coating composition thus prepared is given in Table 3. The composition contained 67 vol % hollow polymeric microspheres (Expancel), calculated as the volume of dry Expancel based on the total volume of the composition. The coating composition obtained had a density of 340 kg/m$^3$.

TABLE 3

Coating composition with Expancel

| Ingredient | wt % |
| --- | --- |
| water | 12.6 |
| surfactants | 0.06 |
| biocide | 0.9 |
| cellulosic thickener (cellulose fibres) | 0.6 |
| hydroxyethyl methyl cellulose | 1.4 |
| vinyl acetate/vinyl neodecanoate/acrylate copolymer dispersion (50% solids) | 46 |
| Expancel 921 WE 40 D24 (10% solids) | 38 |
| defoaming agent | 0.05 |

The coating composition was applied on vertically extending plaster board using two different notched trowels, i.e. trowels no. 1 and 8 with the same results as for the coating composition with glass bubbles of Example 1: with trowel no. 1 (square 4×4×6 mm) it was very easy to apply an evenly and homogeneously distributed wet layer, but with limited layer thickness; with trowel no. 8 (U-notch 4×8×11 mm) a layer with a thickness of more than 3 mm could be easily applied.

TABLE 4

Application of coating composition with Expancel

| trowel | Notch type | Notch size$^a$ (width × distance × depth) | Ease of application | Thickness single layer$^b$ |
| --- | --- | --- | --- | --- |
| 1 | square | 4 × 4 × 6 | ++ | 1.5 mm |
| 8 | U-notch | 4 × 8 × 11 | + | 3.8 mm |

Example 3

A water-based coating composition was prepared by adding an emulsion of acrylic polymer and hollow glass microspheres to a vessel and mixing the two ingredients using a stirrer until a homogeneous paste was obtained. Water, surfactant, thickeners, and further additives (biocide and defoaming agent) were then added under continuous stirring. The composition of the coating composition thus prepared is given in Table 5, it is equal to the composition of Example 1 but for the amount of binder and water.

TABLE 5

Coating composition with hollow glass microspheres

| Ingredient | wt % |
| --- | --- |
| Water | 76 |
| Surfactants | 0.05 |
| Biocide | 0.4 |
| cellulosic thickener (cellulose fibers) | 1.0 |
| hydroxyethyl methyl cellulose | 0.5 |
| vinyl acetate/vinyl neodecanoate/acrylate copolymer dispersion (50% solids) | 2 |
| 3M Scotchlite Glass Bubbles K15 | 20 |
| defoaming agent | 0.05 |

The coating composition was applied on vertically extending plaster board using two different notched trowels, i.e. trowels no. 1 and 8 with the same results as for the coating composition with glass bubbles of Example 1: with trowel no. 1 (square 4×4×6 mm) it was very easy to apply an evenly and homogeneously distributed wet layer, but with limited layer thickness; with trowel no. 8 (U-notch 4×8×11 mm) a layer with a thickness of more than 3 mm could be easily applied. Like in Example 1, the coating composition of Example 3 with the lower amount of binder as compared to Example 1 could be applied as a smooth layer and the layer thickness was easy to control (i.e. easy to obtain a pre-set thickness). Likewise, dried layers of the composition of Example 3 did not crack after 2 days of drying at room temperature at about 55% relative humidity, i.e. a smooth layer was present.

Example 4

A water-based coating composition was prepared by adding an emulsion of acrylic polymer and hollow glass microspheres to a vessel and mixing the two ingredients using a stirrer until a homogeneous paste was obtained. Water, surfactant, thickeners, and further additives (biocide and defoaming agent) were then added under continuous stirring. The composition of the coating composition thus prepared is given in Table 6, it is equal to the composition of Example 1 but for the amount of binder and water.

TABLE 6

Coating composition with hollow glass microspheres

| Ingredient | wt % |
| --- | --- |
| Water | 74 |
| Surfactants | 0.05 |
| Biocide | 0.4 |
| cellulosic thickener (cellulose fibers) | 1.0 |
| hydroxyethyl methyl cellulose | 0.5 |
| vinyl acetate/vinyl neodecanoate/acrylate copolymer dispersion (50% solids) | 4 |
| 3M Scotchlite Glass Bubbles K15 | 20 |
| defoaming agent | 0.05 |

The coating composition was applied on vertically extending plaster board using two different notched trowels, i.e. trowels no. 1 and 8 with the same results as for the coating composition with glass bubbles of Example 1: with trowel no. 1 (square 4×4×6 mm) it was very easy to apply an evenly and homogeneously distributed wet layer, but with limited layer thickness; with trowel no. 8 (U-notch 4×8×11 mm) a layer with a thickness of more than 3 mm could be easily applied. Like in Example 1, the coating composition of Example 4 with the lower amount of binder as compared to Example 1 could be applied as a smooth layer and the layer thickness was easy to control (i.e. easy to obtain a pre-set thickness). Likewise, dried layers of the composition of Example 4 did not crack after 8 days of drying at room temperature at about 55% relative humidity, i.e. a smooth layer was present.

The invention claimed is:

1. A water-based coating composition for heat insulating building surfaces, the coating composition comprising:
   from 55 to 90 vol % hollow microspheres;
   from 1 to 30 wt % of a dispersed acrylic binder polymer;
   from 0.1 to 3 wt % of a thickener;
   from 40 to 80 wt % water; and
   from 0.05 to 5 wt % of additives selected from the group consisting of biocides, anti-foaming agents, surfactants, dispersants, and combinations of two or more thereof,
   wherein the coating composition is substantially free of non-hollow mineral and metallic fillers and is substantially free of hydraulic binders, and wherein the coating composition has a density of less than 500 kg/m$^3$.

2. The water-based coating composition according to claim 1, wherein the thickener is a non-clay thickener.

3. The water-based coating composition according to claim 1, wherein the coating composition has a density of at most 450 kg/m$^3$, preferably at most 400 kg/m$^3$.

4. The water-based coating composition according to claim 1, wherein the coating composition comprises 18 to 30 wt % hollow glass microspheres and wherein the composition is free of non-glass hollow microspheres.

5. The water-based coating composition according to claim 1, wherein the coating composition comprises 1 to 5 wt % hollow polymeric microspheres and wherein the composition is free of non-polymeric hollow microspheres.

6. The water-based coating composition according to claim 1, wherein the coating composition comprises 12 to 30 wt % dispersed acrylic binder polymer.

7. A method for applying a coating composition according to claim 1 to a building surface, comprising:
   a) applying the coating composition to the surface with a notched trowel to obtain a ridged wet layer of coating composition;
   b) adhering a non-woven sheet of glass fiber to the ridged wet layer of coating composition;
   c) smoothening the ridged wet layer of coating composition by applying pressure to the sheet of glass fiber using a smoothening tool to obtain a smoothened wet layer of coating composition;
   d) allowing the smoothened wet layer of coating composition to dry to obtain a smooth dried coating layer; and
   e) optionally applying a decorative layer onto the smooth dried coating layer.

8. The method according to claim 7, wherein a single layer is applied in a) and wherein the smoothened wet layer of coating composition obtained in c) has a thickness from 2 to 10 mm.

9. The method according to claim 8, wherein the notched trowel is a U-notch trowel with a half-circular shape between two adjacent notches.

10. The method according to claim 7, wherein adjacent notches are from 4 to 16 mm apart.

11. The method according to claim 7, wherein the notches have a width of from 2 to 10 mm.

12. The method according to claim 7, wherein two adjacent notches have a distance between them and the notches have a width that is smaller than the distance between two adjacent notches.

13. The method according to claim 7, wherein the notches have a depth that is from 5 to 25 mm.

14. The method according to claim 7, wherein adjacent notches are between from 6 to 12 mm apart.

15. The method according to claim 7, wherein the notches have a width of from 3 to 8 mm.

16. The method according to claim 7, wherein the notches have a width of from 4 to 6 mm.

17. The method according to claim 7, wherein two adjacent notches have a distance between them and the notches have a width that is smaller than the distance between two adjacent notches.

18. The method according to claim 7, wherein two adjacent notches have a distance between them and the notches have a width of at most half the 0.7 times the distance between two adjacent notches.

19. The method according to claim 7, wherein two adjacent notches have a distance between them and the notches have a width of at most half the 0.6 times the distance between two adjacent notches.

20. The method according to claim 7, wherein the depth of a notch is from 5 to 25 mm.

21. The method according to claim 7, wherein the depth of a notch is from 6 to 20 mm.

22. The method according to claim 7, wherein the depth of a notch is from 7 to 15 mm.

23. The method according to claim 7, wherein the depth of a notch is from 8 to 13 mm.

24. A kit of parts for coating a building surface with a heat insulating layer comprising:
   i) a water-based coating composition according to claim 1;
   ii) a non-woven sheet of glass fiber; and
   iii) a notched trowel.

25. The kit of parts according to claim 24, wherein the notched trowel is a notched trowel as defined in claim 9.

26. The kit of parts according to claim 24 further comprising a smoothening tool.

27. The water-based coating composition according to claim 1, wherein the hollow microspheres are present in an amount of 60 to 80 vol %.

28. The water-based coating composition according to claim 1, wherein the thickener is a cellulosic thickener.

29. The water-based coating composition according to claim 1, wherein the coating composition comprises 19 to 25 wt % hollow glass microspheres and wherein the composition is free of non-glass hollow microspheres.

30. The water-based coating composition according to claim 1, wherein the coating composition comprises 2 to 4 wt % hollow polymeric microspheres and wherein the composition is free of non-polymeric hollow microspheres.

31. The water-based coating composition according to claim 1, wherein the coating composition comprises 18 to 25 wt % dispersed acrylic binder polymer.

* * * * *